United States Patent
Trombo-Somerville

(10) Patent No.: US 12,044,785 B2
(45) Date of Patent: Jul. 23, 2024

(54) SYSTEM FOR DETERMINING A MODEL OF A VEHICLE THAT IS TO BE USED BY A POSITIONING SYSTEM

(71) Applicant: Westinghouse Air Brake Technologies Corporation, Pittsburgh, PA (US)

(72) Inventor: Brett Trombo-Somerville, Beausejour (CA)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 195 days.

(21) Appl. No.: 17/500,231

(22) Filed: Oct. 13, 2021

(65) Prior Publication Data

US 2022/0260726 A1 Aug. 18, 2022

Related U.S. Application Data

(60) Provisional application No. 63/149,877, filed on Feb. 16, 2021.

(51) Int. Cl.
*G01S 19/51* (2010.01)
*G01S 19/42* (2010.01)
(Continued)

(52) U.S. Cl.
CPC .............. *G01S 19/51* (2013.01); *G01S 19/42* (2013.01); *G01S 19/48* (2013.01); *G01S 19/243* (2013.01); *H04W 4/023* (2013.01); *H04W 4/40* (2018.02)

(58) Field of Classification Search
CPC ........ G01S 19/243; G01S 19/14; G01S 19/42; G01S 19/48; G01S 19/51; H04W 4/023;
(Continued)

(56) References Cited

U.S. PATENT DOCUMENTS

| | | | | |
|---|---|---|---|---|
| 10,321,339 B2 * | 6/2019 | Hutchins | ............. | H04W 64/006 |
| 11,051,188 B2 * | 6/2021 | Hutchins | ................. | B61L 27/16 |

(Continued)

FOREIGN PATENT DOCUMENTS

| | | |
|---|---|---|
| CN | 107241699 A | 10/2017 |
| EP | 2112782 A1 | 10/2009 |
| KR | 20040002396 A | 1/2004 |

OTHER PUBLICATIONS

Examination Report mailed Sep. 8, 2022 for corresponding Indian Application No. 202214004717 (6 pages).

*Primary Examiner* — Chuong P Nguyen
(74) *Attorney, Agent, or Firm* — K&L Gates LLP

(57) ABSTRACT

System includes one or more processors configured to receive location data from a device communication unit and from at least a first communication unit and a second communication unit that are positioned relative to a vehicle. The location data includes a device spatial location of the device communication unit, a first spatial location of the first communication unit, and a second spatial location of the second communication unit. The one or more processors are further configured to determine a vehicle spatial location of a designated point of the vehicle. The one or more processors are further configured to generate a virtual model. The virtual model, when used by a positioning system to locate the vehicle, indicates the vehicle spatial location relative to an estimated location of the vehicle.

20 Claims, 9 Drawing Sheets

(51) Int. Cl.
*G01S 19/48* (2010.01)
*G01S 19/24* (2010.01)
*H04W 4/02* (2018.01)
*H04W 4/40* (2018.01)

(58) Field of Classification Search
CPC ........... H04W 4/42; H04W 4/46; H04W 4/44; H04W 4/029; H04W 4/40; H04W 64/006
USPC ............ 342/357.63, 357.25, 357.31, 357.34, 342/357.52
See application file for complete search history.

(56) References Cited

U.S. PATENT DOCUMENTS

| | | | |
|---|---|---|---|
| 11,346,959 B2* | 5/2022 | Zheng | G01S 19/243 |
| 11,533,583 B2* | 12/2022 | Miller | H04W 64/006 |
| 2010/0204856 A1* | 8/2010 | Smith | B61L 15/0027 |
| | | | 701/19 |
| 2016/0291165 A1* | 10/2016 | Kim | G01S 19/43 |
| 2020/0003880 A1 | 1/2020 | Witczak et al. | |
| 2022/0268946 A1* | 8/2022 | Kernwein | G01C 21/28 |

* cited by examiner

SYSTEM FOR DETERMINING A MODEL OF A VEHICLE THAT IS TO BE USED BY A POSITIONING SYSTEM

CROSS-REFERENCE TO RELATED APPLICATION

The present application claims priority to and the benefit of U.S. Provisional Application No. 63/149,877, filed on 16 Feb. 2021, and which is incorporated herein by reference in its entirety.

BACKGROUND

Technical Field

Embodiments of the inventive subject matter described herein relate to determining a model of a vehicle that can be used to locate the vehicle with a positioning system.

Discussion of Art

For enterprises that control a fleet of vehicles at any given time, it is desirable to know the locations of the vehicles, especially for vehicles that travel along the same or similar routes. For example, a train may have one or more locomotives and one or more optional rail cars. By knowing the locations of the trains on a rail network, a railway may, for example, more safely and efficiently direct the trains along the various routes. Likewise, fleets having other types of vehicles, such as automobiles, trucks, mining vehicles, off-highway vehicles, aerial vehicles, or marine vessels, may be more safely and efficiently directed along respective routes. Such information may be used at distribution yards where the vehicles are loaded or unloaded with cargo and/or passengers.

Each vehicle may include a number of devices that communicate with one another or a control unit (e.g., controller) of the vehicle. The devices may include a global navigation satellite system (GNSS) receivers, such as global positioning system (GPS) receivers. Other devices include inertial sensors, odometers, radar, and ultrasonic and acoustic monitors. Such devices generate data that can be used to determine a location and/or attitude of the vehicle.

Presently, the location of some vehicles are determined using one or more GNSS receivers, which communicate with GNSS satellites to determine a latitude, longitude, and elevation of each GNSS receiver. Knowing a spatial location of the GNSS receiver, however, does not necessarily provide a reliable understanding of the three-dimensional space occupied by the vehicle. For example, the location of a GNSS receiver that is determined by the GNSS satellites may not be precise. Instead, the identified location can be an estimate providing a certain confidence that the GNSS receiver is located within meters of the identified location. Another issue that increases uncertainty as to a more precise location of the vehicle is that the GNSS receivers may have various positions along the vehicle (e.g., front, back, or somewhere in between). For example, a first vehicle in a vehicle system may have a GNSS receiver located closer to a front end of the first vehicle, whereas a second vehicle may have a GNSS receiver located closer to a back end of the second vehicle.

To provide a more reliable understanding of where a vehicle is located, enterprises can measure where the GNSS receivers are located on the vehicle relative to a known point, such as the front end or back end of the vehicle. Today, locations of GNSS receivers may be manually measured and are susceptible to human error. The higher error variance is carried forward and negatively affects the ultimate calculations of a vehicle's position, causing the calculated positioned to be less accurate than desired. It may be desirable to have a system and method that differs from those that are currently available.

BRIEF DESCRIPTION

In an embodiment, a system is provided that includes a movable communication device including a device communication unit. The device communication unit may be positioned relative to the vehicle. The system includes a controller. The controller may include one or more processors that may receive location data from the device communication unit and from at least a first communication unit and a second communication unit that are positioned relative to the vehicle. The location data may include a device spatial location of the device communication unit, a first spatial location of the first communication unit, and a second spatial location of the second communication unit. The one or more processors are that may determine a vehicle spatial location of a designated point of the vehicle based on a first distance between the first spatial location and the second spatial location, a second distance between the device spatial location and the first spatial location, and a third distance between the device spatial location and the second spatial location. The one or more processors are that may generate a virtual model of the vehicle based on the vehicle spatial location of the designated point. The virtual model, when used by a positioning system to locate the vehicle, indicates the vehicle spatial location relative to an estimated location of the vehicle.

In an embodiment, a movable communication device is provided that may include a device communication unit that may acquire location data and a user interface that may receive user inputs and, responsive to receiving the user inputs, communicate control signals. The movable communication device may include one or more processors that may receive the control signals from the user interface. Responsive to receiving the control signals, the one or more processors can be that may request and receive the location data from the device communication unit. The one or more processors can be that may at least one of communicate a device message to at least one of a remote station or the vehicle, wherein the device message may include at least one of the location data or a request for location data from the vehicle, or receive a vehicle message from the vehicle, wherein the vehicle message may include the location data of the vehicle from a first communication unit and a second communication unit of the vehicle.

In an embodiment, a method is provided that may include positioning a movable communication device relative to a designated point of the vehicle. The movable communication device may include a device communication unit. The method may include receiving location data from the device communication unit and from at least a first communication unit and a second communication unit that are positioned relative to the vehicle. The location data may include a device spatial location of the device communication unit, a first spatial location of the first communication unit, and a second spatial location of the second communication unit. The method may include determining a vehicle spatial location of a designated point of the vehicle based on a first distance between the first spatial location and the second spatial location, a second distance between the device spatial location and the first spatial location, and a third distance between the device spatial location and the second spatial location. The method may include generating a virtual model of the vehicle based on the vehicle spatial location of the designated point. The virtual model, when used by a positioning system to locate the vehicle, indicates the vehicle spatial location relative to an estimated location of the vehicle.

One or more embodiments may include tracking a vehicle (or multiple vehicles, such as those in a fleet) using the virtual model(s). For example, one or more embodiments may include a positioning system that identifies a location of a vehicle or multiple vehicles. In addition to the above, one or more embodiments may transmit commands or instructions to the vehicle (or vehicles). Such commands or instructions may be to control vehicle movements (e.g., move the vehicle within a larger geographic region or within a local area (e.g., distribution yard)) or to control vehicle operations (e.g., cause the vehicle to perform certain actions, such as opening a door, checking a status of the vehicle, decoupling from other vehicles, etc.).

BRIEF DESCRIPTION OF THE DRAWINGS

Reference is now made briefly to the accompanying drawings, in which.

DETAILED DESCRIPTION

Figure 1:
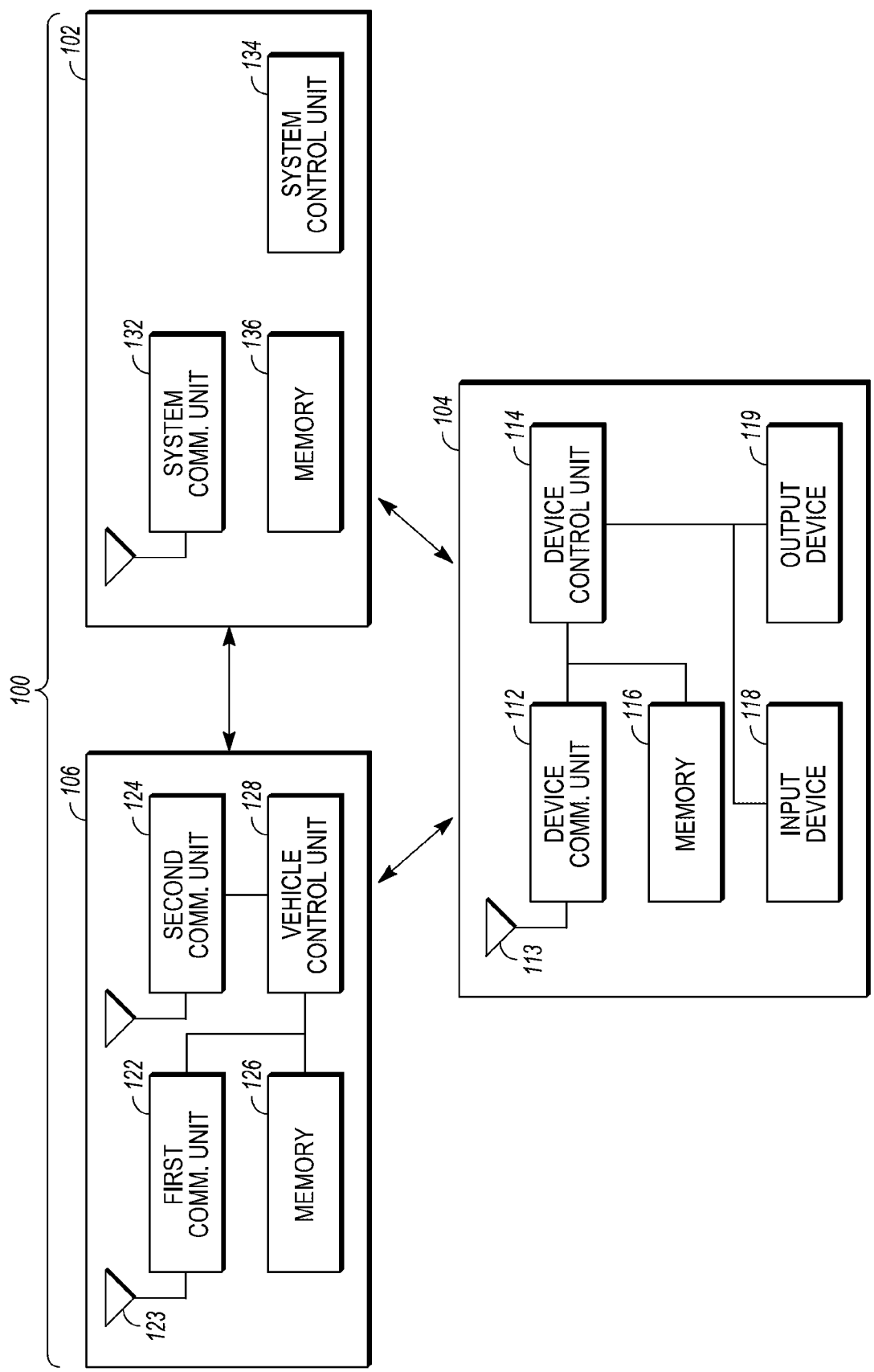
FIG. 1 is a schematic diagram of a system (e.g., a communication system) for determining a virtual model of a vehicle that represents a space occupied by the vehicle in a positioning system in accordance with one embodiment.

Embodiments of the inventive subject matter described herein include systems and methods that determine a model of a vehicle that enables a more accurate estimation of where the vehicle is located and/or a more accurate estimation of the physical space occupied by the vehicle. With more accurate estimations, potential collisions or other mishaps may be avoided. For example, movement of the vehicle may be changed (e.g., slowed, stopped, and/or moved onto another route) using the estimation of the location and/or vehicle-occupied space. Moreover, current locating systems may use measurements with added offsets or, while estimating the position of a vehicle, may add offsets to the estimation. These offsets are intended to address potential error that can occur while measuring a vehicle or that can be caused by equipment communicating the location data (e.g., satellites or GPS receivers). The offsets may be reduced or eliminated with a more accurate understanding of the physical space occupied by the vehicle. Accordingly, traffic may be more safely controlled and more efficiently controlled (e.g., by requiring less distance between vehicles in a loading or unloading zone or that are moving along a route). In some cases, computing resources can be reduced when using a more accurate estimation.

To this end, embodiments may utilize a movable communication device having a communication unit (e.g., antenna, receiver, or transceiver). The movable communication device can be positioned relative to (e.g., adjacent to or a designated distance from) a designated point of the vehicle and acquire location data that is used to determine a spatial location of the designated point. One or more communication unit(s) of the vehicle may be used to acquire location data that corresponds to spatial locations of the communication units. The set of spatial locations may be used to generate a more accurate and/or more cost-efficient model of the vehicle. For example, the vehicle can be monitored, located, or tracked in a safer and/or more efficient manner.

The subject matter described herein may be used in connection with rail vehicles and rail vehicle system, such as locomotives and trains. In one embodiment, the movable communication device is housed in an End of Train (EOT) device that can be mounted on a rail vehicle. In another embodiment, the movable communication device can be part of a Head of Train (HOT) system for use with a rail vehicle. The subject matter, however, may be used in connection with other types of non-rail vehicles. For example, the subject matter described herein may be used in connection with automobiles, buses, trucks, mining vehicles, agricultural vehicles, other off-highway vehicles (e.g., vehicles that are not designed or are not legally permitted for travel on public roadways), aerial vehicles (e.g., fixed wing aircraft, drones or other unmanned aircraft, etc.), marine vessels, and the like.

In some embodiments, the systems and methods described herein may be carried out during at least one of manufacturing or assembling the vehicle or when the vehicle is at least one of repaired, modified, or updated (e.g., by retrofitting components to an existing vehicle). In other embodiments, the systems and methods may be carried out in the field, such as at a distribution yard or along a route. For example, during installation of new communication units, measurements may be acquired, as described herein, using a temporary reference antenna of a movable communication device. With the measurements between each of the communication units obtained, a virtual model of the spatial locations of the communication units may be applied to a local coordinate system, such as one that may include a representation of the vehicle. For example, the virtual model may be overlaid or combined with a local coordinate system to form a merged model. The merged model may represent a physical structure of the vehicle or represent a physical structure of a vehicle system that may include the vehicle. In this manner, a monitoring system that tracks the vehicle (or vehicle system) may more accurately determine a position of the vehicle.

One or more embodiments may be at least partially automated. For example, after positioning a movable communication device adjacent to a vehicle, an operator of the movable communication device (or an operator of a remote system) may initiate the process by providing a user input (e.g., pressing a button, or switch, pulling a lever, providing a vocal activation command, etc.). Alternatively, the process may be initiated after one or more processors determines that the movable communication device is properly positioned relative to the vehicle (e.g., with a known distance from the designated point). Once the process is initiated, embodiments may acquire location data for each antenna and determine measurements between the antennas.

Automating the measurement process may significantly decrease measurement error and significantly decrease the amount of time used for obtaining the measurements. Communication systems used by some enterprises, such as vehicle control systems, may permit or assume a designated amount of error. The vehicle control systems may be computerized systems that use vehicle locations to restrict or allow movements of different vehicles. For example, a positive vehicle control system (e.g., a positive train control system) may monitor vehicle locations and communicate signals to different vehicles. These signals can restrict how fast vehicles move based on locations and/or models of other vehicles, instruct vehicles whether the vehicles are permitted to enter into different route segments (e.g., based on vacancies and occupancies of the different route segments determined using vehicle locations and/or models), and the like. Onboard components of positive vehicle control systems can automatically prevent movement of the vehicles faster than limits, into different route segments, etc., unless a signal is received from the positive vehicle control system. A negative vehicle control system may monitor vehicle locations and communicate signals to different vehicles. These signals can inform the vehicles how fast the vehicles are allowed to travel, prohibit vehicles from entering different route segments, etc. Onboard components of negative vehicle control systems can allow the vehicles to move unless a signal is received prohibiting a movement of the vehicle.

The designated amount of error that is assumed by the communication systems of some enterprises can be based not only on measurement errors relating to the position of the antennas, but on error that occurs in the process of locating a vehicle (e.g., errors caused by equipment performance). By reducing the measurement error with respect to the position of the antennas, the total error with respect to a location of a vehicle is reduced. As such, enterprises may be permitted to automatically control the vehicle along more portions of a route without input from a human conductor for at least some circumstances.

A vehicle system may be part of a vehicle group. The vehicle group may be referred to as a vehicle consist, platoon, fleet, swarm, train, and the like. A consist can include two or more vehicles mechanically coupled with each other to travel along a route together. In other embodiments, the vehicle system can include two or more vehicles that are not mechanically coupled with each other, but that travel along a route together. For example, two or more automobiles may be logically coupled in that the automobiles wirelessly communicate with each other as the vehicles automobiles travel along the route together as a vehicle system to coordinate movements with each other. One or more embodiments may control the vehicles in an automated manner and/or inform operators (onboard or off-board the vehicles) of how to control or change movement of the vehicles. Particular embodiments may include controlling the vehicles as drones of a larger fleet. In one embodiment, a vehicle system is formed from only a single vehicle.

The two or more vehicles of a vehicle system may include a controlling vehicle and one or more remote vehicles. In operation, the controlling vehicle can command (e.g., through wired or wireless messages) the remote vehicle(s) to change throttle settings, brake settings, speeds, power outputs, or the like of the remote vehicles during movement of the vehicle consist. As such, the controlling and remote vehicle may coordinate tractive and braking efforts to move the vehicle consist along the route.

For at least some embodiments, the movable communication device may communicate with at least the controlling vehicle. In some embodiments, the movable communication device may communicate with at least the controlling vehicle and one or more remote vehicles. In some embodiments, the movable communication device may communicate with any vehicle that is capable of communicating with the movable communication device. Regardless of the vehicle, the movable communication device may communicate directly with the communication units of the vehicle or communicate directly with a local control unit of the vehicle that controls the communication units.

Yet in other embodiments, the movable communication device may communicate with a remote system that communicates with the vehicle. In this case, measurement may be separately acquired by the vehicle and separately acquired by the movable communication device. The measurements may then be transmitted to the remote system.

One or more embodiments may use at least three different communication units in which location data for each communication unit is obtained. The location data may include or be used to determine a spatial location of the respective communication unit. For example, the location data may include signals (e.g., transmitted by satellites) that include positioning and timing data. The positioning and timing data can then be used to determine spatial coordinates of a known system (e.g., latitude, longitude, and elevation), map coordinates for projecting onto a known model, earth-centered, earth, earth-fixed (ECEF) Cartesian coordinates, or a spatial code (e.g., set of numbers or symbols). In other embodiments, however, the location data may include the actual spatial location of the vehicle. The location data may be obtained using a system capable of geo-spatial positioning, such as a global or regional navigation system. Although particular embodiments are described with respect to GNSS, embodiments may be suitable for a regional navigation system or another system capable of radionavigation or radiolocation.

The spatial location of the movable communication device (or device communication unit) may represent a spatial location of a designated point of the vehicle or may be used to determine the spatial location of the designated point, as described herein. The designated point may correspond to a surface (e.g., outer surface) of the vehicle.

A spatial location means a point or region in space that was identified using the communication unit or, more generally, using the movable communication device or communication system. For example, a GPS receiver may only identify a spatial location determined by the signals received by the GPS satellites. As such, the spatial location may correspond to the location of the communication unit (e.g., antenna). In other examples, the communication unit may be programmed (or the system to which the communication unit belongs may be programmed) to identify the spatial location of the device/system as being a predetermined distance away from the spatial location of the communication unit. For example, locomotives are large machines. Location data received by a GPS receiver located at a front end of the locomotive would identify the location of the locomotive as being where the GPS receiver is located. In some configurations, however, the location data may be processed to move the initially calculated point so that the identified spatial location of the locomotive is at a center of the locomotive.

With the spatial location of the designated point (e.g., on the front surface of the vehicle) and the spatial locations of the communication units known, a local model (e.g., virtual model) based on the spatial locations may be generated. This local model may represent points in a three-dimensional space, wherein the points represent the spatial locations of the designated point of the vehicle and the communication units of the vehicle. The local model may then be applied to a geometric model (or local coordinate system) of the vehicle or a geometric model of the vehicle system. The geometric model may include, for example, a three-dimensional shape of the vehicle or the vehicle system. The geometric model may include a location of one or more of the communication units relative to other parts of the vehicle or may include a reference point from which the location of the one or more communication units may be determined.

By applying the local model to the geometric model, a merged model is generated that can include a more accurate representation of the particular vehicle from which the measurements were obtained. For example, if one or more of the communication units is positioned at a designated location relative to an exterior of the vehicle, the spatial locations of the communication units may identify where an exterior surface of the vehicle is located. In this manner, embodiments may more precisely determine locations for one or more surfaces along a front end of the vehicle, one or more surfaces along a back end of the vehicle, and/or one or more surfaces along a side of the vehicle. A side may include a top side, bottom side, or lateral sides.

Because one or more embodiments include or interact with multiple communication units, the term "communication unit" may be labelled to distinguish between other communication units. For example, embodiments may include a device communication unit, a movable communication unit, a system communication unit, a vehicle communication unit, a first communication unit, second communication unit, etc. Communication units that are labelled differently do not necessarily have a different structure and/or operating capabilities. Furthermore, numerical labels do not necessarily limit the number of communication units. For example, embodiments that include a first communication unit and a second communication unit are not necessarily limited to only two communication units.

The movable communication device may include a communication unit, which may be referred to as a device communication unit. The movable communication unit is positioned relative to the vehicle. As used herein, the phrase "positioned relative to the vehicle" means positioned at a designated location with respect to a designated point of the vehicle. The designated point may be a reference point (or fiducial landmark) of the vehicle. In some embodiments, the designated point typically has a fixed position with respect to the vehicle. The designated point may represent or be positioned close to an outer boundary of the vehicle. The designed point may be located on the most forward surface (e.g., front end) or most rearward surface (e.g., back end) of the vehicle. The designated point could be one of the most lateral surfaces (e.g., sides) of the vehicle. However, the designated point may have other locations along an exterior surface of the vehicle or within the vehicle.

The movable communication device or the device communication unit may be positioned adjacent to the vehicle. As used herein, the phrase "adjacent to" may include the movable communication device or a communication unit directly engaging a surface of the vehicle or may include the movable communication device or a communication unit being slightly spaced apart from the vehicle, such as at most 10 centimeters. For such embodiments in which the movable communication device is adjacent to but not contacting the vehicle, the movable communication device may be positioned at a predetermined spatial location relative to the designated point.

The movable communication device may have a support structure that may be positioned onto the vehicle. The support structure may be similar to a stand, carriage, tripod, or monopod. For example, an end of a monopod holding the communication unit may be positioned onto a knuckle of a locomotive. The monopod may then be held at an upright, elevated position and at a designated orientation. In such instances, a distance between the device communication unit and the designated point can be calculated because the dimensions of the support structure are known and the positioning of the support structure is set. Accordingly, the spatial location of the designated point of the vehicle may be determined.

While positioned relative to the vehicle, location data of the movable communication device (or device communication unit) is acquired in addition to the location data for at least two other communications units. At least one or more of the other communication units may form part of the vehicle. Such communication units travel with the vehicle and may be used to track the vehicle as the vehicle travels along a route or used to communicate other messages. For example, the other communication units may be, for example, a GNSS receiver, a radionavigation-satellite service (RNSS) receiver, a multi-band transceiver capable of operating within at least one of GNSS or RNSS, or other communication units that may be used for radionavigation or radiolocation.

In some embodiments, only one of the communication units may be part of the vehicle and two or more of the communication units may be part of respective movable communication devices that are positioned relative to the vehicle. For example, a first movable communication device may be positioned relative to a front end of the vehicle, and a second movable communication device may be positioned relative to a back end of the vehicle. In such embodiments, only one communication unit of the vehicle may be used. In other embodiments, however, at least two communication units of the vehicle may be used. For example, embodiments may use two or more movable communication devices and two or more communication units that are connected to the vehicle.

The movable communication device may handheld by an operator. In such embodiments, the movable communication device may be referred to as a portable communication device. For example, the portable communication device may have a size, shape, and weight that allows an average-sized adult to carry the portable communication device. Non-limiting examples of the portable communication device include tablet computers, laptop computers, and smartphones. As such, the operator may move between different vehicles within an area (e.g., distribution yard, classification yard, assembly line, etc.) and acquire information for generating models that may be used to track the vehicles.

The movable communication device may be held by the operator as the location data of the movable communication device is acquired. In other embodiments, however, the movable communication device may be temporarily secured to the vehicle using a removable fastener (e.g., clamp, clip, screw). While temporarily secured, the movable communication device may have a fixed position with respect to the vehicle. For such embodiments, the operator may be permitted to secure one or more other movable communication devices to the vehicle. The operator may be permitted to access the interior of the vehicle while the movable communication device or devices are temporarily secured. For example, after temporarily securing the movable communication device or devices to the vehicle, the operator may enter the vehicle and interact with a user interface to cause or allow the communication unit(s) of the vehicle to acquire the location data.

Yet in other embodiments, the movable communication device may be permanently secured to the vehicle. For example, the operator may use a tool to permanently secure the movable communication device to a fixed point at a front end or back end of the vehicle. The movable communication device may be enabled to acquired and communicate the location data.

The movable communication device may include a user interface that is responsive to interaction with an operator. The user interface may generate control signals responsive to operator manipulation or direction of the user interface. For example, the operator may press a button, touch a screen, and/or speak into a microphone, thereby instructing the movable communication device to carry out one or more operations and/or providing requested information for carrying out one or more operations.

Optionally, the movable communication device may communicate with a local control unit onboard the vehicle. In such instances, the movable communication device may operate as the primary or controlling device that initiates one or more methods described herein. In other embodiments, however, the local control unit may operate as the primary or controlling unit that uses the movable communication device to acquire location data. For example, the movable communication device may only request location data if the local control unit commands the movable communication device to acquire the location data.

At least one technical effect provided by the inventive subject matter may include a more reliable location of a vehicle, such as when locating the vehicle in-transit or when parked. The vehicle can be located in real-time, such as within an expected amount of time for conventional navigation/location systems (e.g., within one second, two seconds, ten seconds, one minute, or multiple minutes of the vehicle being in the identified location). With a more reliable location, enterprises may direct the vehicle within a region with greater confidence. With more reliable locations of multiple vehicles, built-in errors may be reduced so that an enterprise may more efficiently direct the vehicles (e.g., for traveling along a route or for loading or unloading). For enterprises that remotely control one or more vehicles like drones, the more reliable locations can reduce collisions and/or allow tighter gaps between vehicles or between vehicle systems.

FIG. 1 is a schematic diagram of a system (e.g., a communication system) 100 for determining a three-dimensional model representing a space occupied by a vehicle in accordance with one embodiment. The system 100 may include a remote station 102, a movable communication device 104, and a vehicle communication system 106. The vehicle communication system may be a communication system of the vehicle-to-be-tracked. For example, the vehicle communication system may be part of a controlling vehicle of a vehicle consist, and the controlling vehicle communicates with remote vehicles of plural vehicle consists.

Each of the remote station, the vehicle communication system, and the movable communication device may be equipped with one or more communication units, one or more control units, and one or more storage devices (e.g., memory). For example, the movable communication device may include a device communication unit 112, a device control unit 114, memory 116, an input device 118, and an output device 119. The communication unit has a transceiver or antenna 113.

The vehicle communication system may include a first communication unit 122, a second communication unit 124, a vehicle control unit 128, and memory 126. The communication units may have a transceiver 123. Although not shown, the vehicle communication system may include an input device and an output device that form at least parts of a user interface. Likewise, the remote station may include a system communication unit 132, a system control unit 134, and memory 136. The remote station may include a user interface having an input device and an output device.

The communication system of FIG. 1 may include or be part of a distributed computing environment. As used herein, "one or more processors" may include at least one processor (e.g., controller) of the movable communication device, at least one processor of the vehicle, and at least one processor of the remote station. Embodiments may be practiced with various computer system configurations, including multi-processor systems, microprocessor-based or programmable consumer electronics, minicomputers, mainframe computers, and the like. In a distributed computing environment, tasks may be performed by devices or systems that are independent with respect to one another but are linked through a communications network. One or more of the devices or systems may be remotely located. In a distributed computing environment, program modules may be in both local and remote computer storage media including memory storage devices. Distributed computing environments may be contained within a vehicle (e.g., locomotive), multiple vehicles in the vehicle system, other vehicles of a fleet, or off-board in wayside or central offices where wireless communication is used.

Some embodiments, however, are not necessarily practiced within distributed computing environments. For example, one or more embodiments may be entirely practiced within the movable communication unit, with the vehicle communication system, or within the remote station.

As used herein, a "communication unit" includes a receiver or transceiver and associated circuitry (e.g., antennas) for wirelessly communicating (e.g., communicating and/or receiving) messages within one or more bands. The messages may include linking messages for establishing a network, command messages, confirmation messages, reply messages, retry messages, repeat messages, or the like. The communication unit may communicate within predetermined radiofrequency (RF) bands and in accordance with designated protocols. For example, the communication units may communicate according to one or more satellite navigation standards, such as at least one of GPS, Global Navigation Satellite System (GLONASS), BeiDou Navigation Satellite System (BDS), Galileo, Navigation with Indian Constellation (NavIC), Quasi-Zenith Satellite System (QZSS), Doppler Orbitography and Radio-positioning Integrated by Satellite (DORIS), or the like. The communication units may augment the location data or receive augmented location data. Augmentation may include calculating the spatial location by using additional external information.

A controller or control unit (e.g., device control unit, vehicle control unit, or system control unit) may include one or more processors. The one or more processors can include or represent one or more hardware circuits or circuitry that include, are connected with, or that both include and are connected with one or more microprocessors, controllers, or other hardware logic-based devices. The one or more processors may operate based on program instructions (e.g., software) stored within the memory. The one or more processors and associated memory may perform one or more operations of the embodiments described herein in addition to other operations. For example, the movable communication device may be a personal communication device, such as a smartphone or tablet computer, having an application that may practice one or more embodiments. As such, the same processor and associated memory used to perform one or more embodiments may be used to perform operations typically associated with a smartphone. Likewise, the one or more processors of the vehicle communication system may perform operations typically associated with moving the vehicle (e.g., commanding a propulsion system and/or braking system). As another example, the one or more processors of the vehicle communication system may communicate command messages to other vehicles (e.g., remote vehicles).

Memory can represent a tangible and non-transitory computer readable storage medium, such as a computer hard drive or other volatile or non-volatile memory. The memory can store one or more sets of instructions (e.g., software) that directs the one or more processors to perform one or more operations. The memory can represent a local device that electronically and/or magnetically stores data. For example, the memory may represent a computer hard drive, random access memory, read-only memory, dynamic random access memory, an optical drive, or the like.

Optionally, the remote station, the vehicle communication system, and the movable communication device may include a user interface having an input device and an output device. The input device may include or represent a touchscreen, keyboard, electronic mouse, joystick, handheld controller, microphone, or the like. The output device may include or represent a display screen, such as a monitor, that provides a visual user interface to the operator at the controlling vehicle. The output device optionally may include other components, such as audio speakers, haptic or vibration elements, or the like. A user interface may include only one or more input devices, only one or more output devices, or both input device(s) and output device(s).

Figure 2:
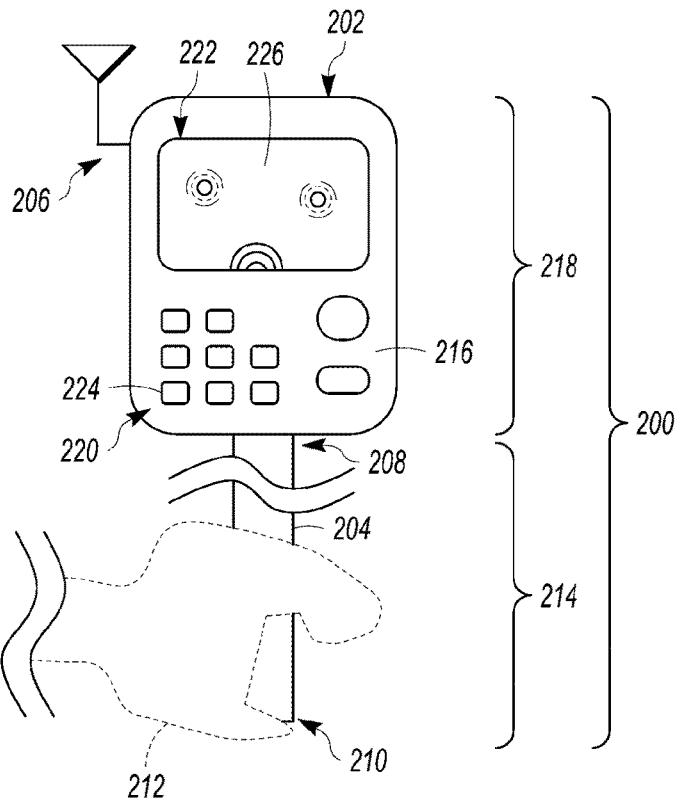
FIG. 2 is a schematic diagram illustrating a movable communication device that may be used with the system of FIG. 1.

FIG. 2 illustrates a movable communication device 200 that may be used with a communication system, such as the system shown in FIG. 1. As shown, the movable communication device is a portable communication device that can be readily carried by an average-sized adult. For example, the movable communication device may include a main body 202 and a support structure 204. The main body represents the computing device that carries the communication unit 206. For example, the main body may be similarly sized to a tablet computer, laptop, or smartphone.

The support structure in FIG. 2 is a monopod. More specifically, it is an elongated staff or rod having a first or top end 208 where the main body is secured. A second or bottom end 210 of the support structure is opposite the first end. A portion of the support structure that may include the second end is positioned adjacent to a coupler or knuckle 212 of a locomotive (not shown). The support structure has an indeterminate first dimension 214 (as represented by the separated wavy lines). The first dimension in FIG. 2 is a length that enables positioning the movable communication device at a designated elevation. The first dimension may be, for example, one meter or more, although other dimensions may be used.

The main body may include a housing 216 and a user interface 218 that may include an input device 220 and an output device 222. In FIG. 2, the input device may include user-selectable elements 224, such as buttons of varying size. The input device may include an audio receiver. As shown, the output device includes a display 226. The output device may include an audio speaker. Optionally, the display may be touch-sensitive. Accordingly, the touch-sensitive display may form a part of the input device and a part of the output device of the user interface. As described herein, the user interface may direct a user through a designated workflow for acquiring location data.

Figures 3A, 3B:
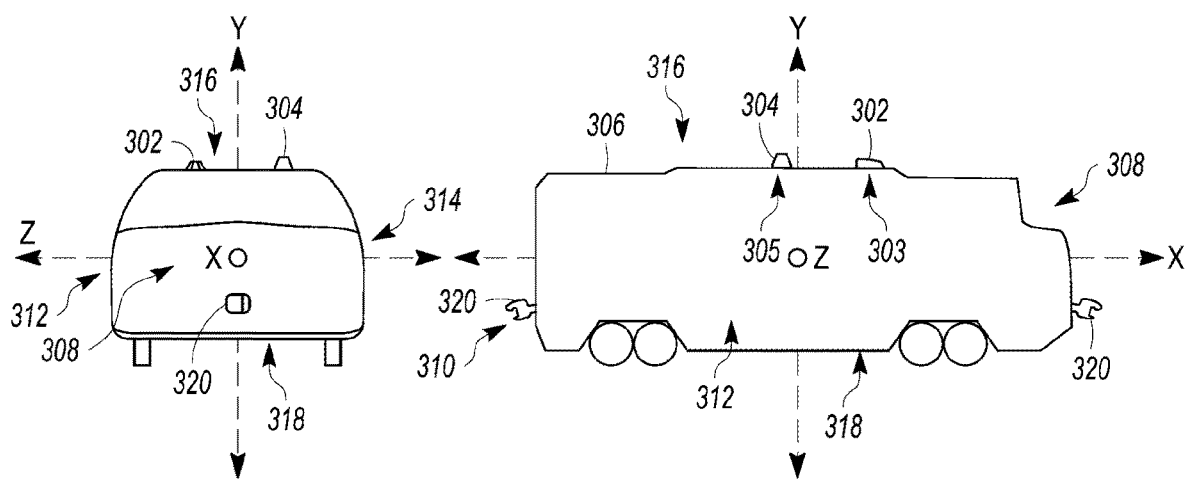
FIG. 3A is a front-end view of a vehicle from which a virtual model may be generated in accordance with one embodiment.
FIG. 3B is a side view of the vehicle from which a virtual model may be generated in accordance with one embodiment.

FIG. 3A is a front-end view of a vehicle 300 in accordance with one embodiment, and FIG. 3B is a side view of the vehicle. For illustrative purposes, mutually perpendicular X, Y, and Z axes are shown. FIGS. 3A and 3B illustrate one example of where a first communication unit 302 and a second communication unit 304 may be positioned with respect to the vehicle. More specifically, the vehicle may include a vehicle body 306. The vehicle body 306 may include a first (or forward) end 308, a second (or rearward) end 310, a first side 312, a second side 314, a top (or top side) 316, and a bottom (or underside) 318. The first and second communication units are positioned along the top of the vehicle. The first and second communication units, however, have different locations or positions along the top. For embodiments in which the vehicle may be interconnected with other vehicles (e.g., locomotives), the vehicle may include couplers or knuckles 320 located at the first end or the second end.

The first communication unit and the second communication unit may have respective spatial locations 303, 305. The spatial location is a three-dimensional location or position, which may be expressed in a variety of manners. For example, the spatial location may be expressed by X, Y, Z coordinates, by latitude, longitude, and elevation coordinates, by map coordinates within a designated model, by a spatial code, and the like. The spatial location may be those spatial locations used by known satellite navigation systems (e.g., GNSS) or other radionavigation systems.

In some embodiments, at least one of the first communication unit and the second communication unit are located along an exterior of the vehicle. In other embodiments, at least one of the first communication unit or the second communication unit is positioned within an interior of the vehicle or positioned within the body of the vehicle such that the first communication unit and/or the second communication unit are not readily viewable or accessible.

Figure 4:
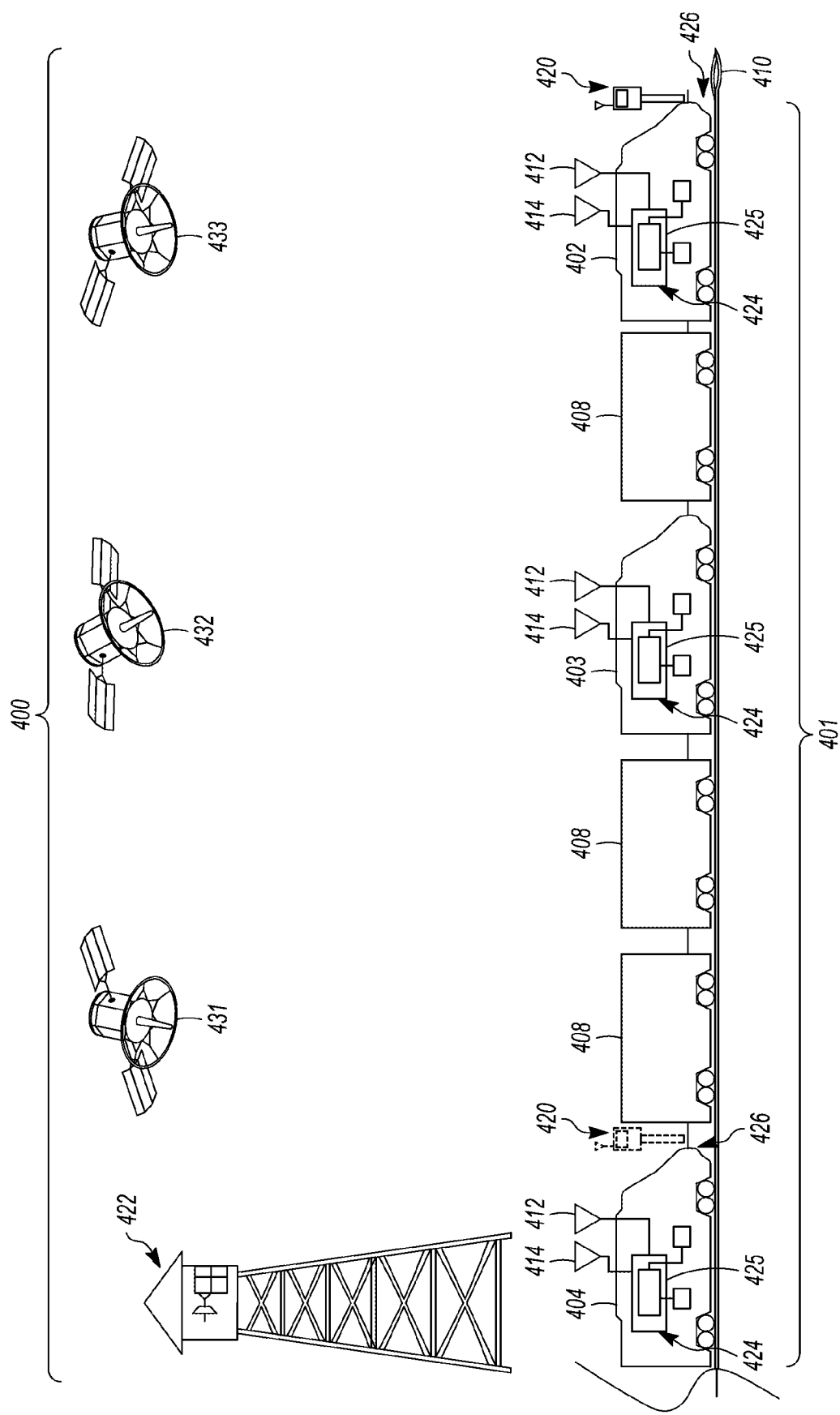
FIG. 4 illustrates an environment, in accordance with one embodiment, in which portions of the system of FIG. 1 are distributed with respect to one another.

FIG. 4 illustrates an environment, in accordance with one embodiment, in which portions of a system 400 (e.g., communication system) are distributed with respect to one another but communicate with one another to acquire data for generating a virtual model of a vehicle. A vehicle system 401 is shown and may include vehicles 402, 403, 404 of the vehicle system, which may be referred to as a vehicle consist. In the illustrated embodiment, the vehicles are propulsion-generating vehicles that are indirectly coupled to one another through non-propulsion-generating vehicles 408. Each of the propulsion-generating vehicles and the non-propulsion-generating vehicles is mechanically coupled to at least one other vehicle. The vehicle system or consist may travel along a route 410.

The propulsion-generating vehicles are shown as locomotives, the non-propulsion-generating vehicles are shown as rail cars, and the vehicle system is shown as a train in the illustrated embodiment. Alternatively, the vehicles may represent other vehicles, such as automobiles, marine vessels, or the like, and the vehicle consist can represent a grouping or coupling of these other vehicles. The number and arrangement of the vehicles in the vehicle consist are provided as one example and are not intended as limitations on all embodiments of the subject matter described herein.

Each of the propulsion-generating vehicles may include a first communication unit 412 and a second communication unit 414 and may communicate with one another. The propulsion-generating vehicles can be arranged in a variety of ways. In some embodiments, the arrangement may be a distributed power (DP) arrangement. For example, the propulsion-generating vehicles can include a controlling vehicle that issues command messages to the other propulsion-generating vehicles which are referred to herein as remote vehicles. The designations "controlling" and "remote" are not intended to denote spatial locations of the propulsion-generating vehicles in the vehicle consist, but instead are used to indicate which propulsion-generating vehicle is communicating (e.g., transmitting, broadcasting, or a combination of transmitting and broadcasting) command messages and which propulsion-generating vehicles are being remotely controlled using the command messages. For example, the controlling vehicle may or may not be disposed at the front end of the vehicle consist (e.g., along a direction of travel of the vehicle consist). Additionally, the remote vehicles need not be separated from the controlling vehicle. For example, a remote vehicle may be directly coupled with the controlling vehicle or may be separated from the controlling vehicle by one or more other remote vehicles and/or non-propulsion-generating vehicles.

The command messages may direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The controlling vehicle issues the command messages to coordinate the tractive efforts and/or braking efforts provided by the propulsion-generating vehicles. This may propel the vehicle consist along a route. Suitable routes may include a track, road, waterway, or the like depending, in part, on the vehicle type and end use application. In addition to command messages and linking messages, the controlling vehicle or one or more of the remote vehicles may communicate location messages that include location data.

Also shown, the system may include one or more movable communication devices 420 and, optionally, a remote station 422. The system may acquire location data broadcasted by at least a first satellite 431, a second satellite 432, and a third satellite 433. In other embodiments, however, fewer or more satellites may be used or other broadcasters may be used. The first and second communication units may receive location data (e.g., positioning and timing data) from one or more of the satellites. The vehicles may include a vehicle communication system 424 having at least one processor 425 that is communicatively coupled to the communication units. The vehicle communication system and/or the communication units may use the location data to calculate a spatial location of the first communication unit and a spatial location of the second communication unit. Alternatively, the at least one processor of the vehicle communication system may partially process the location data and communicate the position data to another system. Alternatively, the vehicle may communicate the location data to another system without any processing. The other system or systems may be, for example, the movable communication device or the remote station.

As shown, two of the vehicles have a movable communication device positioned at a front end 426 of the vehicle. In some embodiments, a user of the movable communication device can move between different vehicles and separately acquire location data for one or more vehicles. The location data for each vehicle may be used to generate a virtual model of the vehicle that may be used to locate the vehicle in a positioning system.

To acquire location data for each vehicle, a communication link may be established between the movable communication device and at least one of a vehicle or the remote station. A communication link may be defined by a communication handshake between two entities. For example, communication of a first message from a movable communication device to a remote station (e.g., a linking message) followed by successful communication of a second message from the remote station to the movable communication device (e.g., a confirmation message) may be a communication handshake that establishes a communication link. Optionally, the communication link may be established by a dedicated communications channel being used between the two entities. For example, a designated frequency or frequency band may define a communication link.

In some embodiments, at least two of the vehicle communication system, the movable communication device, or the remote station establish a communication link between each other. For example, the movable communication device can establish a communication link with each vehicle communication system and a communication link with the remote station. Alternatively, the movable communication device can establish a communication link with the vehicle communication system of the controlling vehicle (or lead vehicle) and a communication link with the remote station. Alternatively, the movable communication device can establish a communication link with only the vehicle communication system that the movable communication device is currently measuring or a communication link with only the vehicle communication system of the controlling vehicle. Alternatively, the movable communication device can establish a communication link with only the remote station.

To establish a communication link between a first entity and a second entity (e.g., between a movable communication device and a remote station, between a movable communication device and a vehicle communication system, or between a vehicle communication system and a remote station), a first entity may communicate a linking message to a second entity. The linking message may include a unique identifier code that is associated with the second entity. For example, a vehicle be associated with a unique vehicle code that corresponds to the vehicle. The unique identifier code may not be associated with or otherwise identify other entities in one embodiment. At the second entity that receives linking message, if the unique identifier code in the linking message matches, is associated with, or otherwise identifies the second entity, then the second entity may communicate a confirmation message back to the first entity. The communication link between the first and second entities may be established responsive to the linking message being received by the second entity and a confirmation message being received by the first entity. Alternatively, the communication link between the first and second vehicles may be established once the linking message is received at the second entity, without requiring a confirmation message from being received back at the first entity.

The linking messages may be communicated by a remote station, by a vehicle communication system, or by a movable communication device. Likewise, the confirmation messages may be communicated by a remote station, by a vehicle communication system, or by a movable communication device. In some embodiments, establishing a communication link may occur at least partially automatically. For example, upon opening an application, a remote station may automatically send linking messages to one or more movable communication devices. The user of the movable communication device may be prompted to respond (e.g., "Establish communication link with remote station?"). If affirmed, the movable communication device may communicate a confirmation message. Alternatively, the movable communication device can automatically send the confirmation message in response to receiving the linking message.

As another example, a user of the movable communication device may provide user inputs. Responsive to the user inputs, the movable communication device may communicate a linking message to at least one of a vehicle or a remote station. Upon receiving a confirmation message, the user of the movable communication device may begin a workflow for acquiring location data for generating a virtual model of the vehicle.

For some embodiments, the user may be onboard the vehicle when communicating a linking message or when confirming receipt of the linking message. Responsive to operator manipulation of the user interface onboard the remote vehicle, the user interface generates signals for communicating a linking message or for indicating the linking message has been received.

Figure 5:
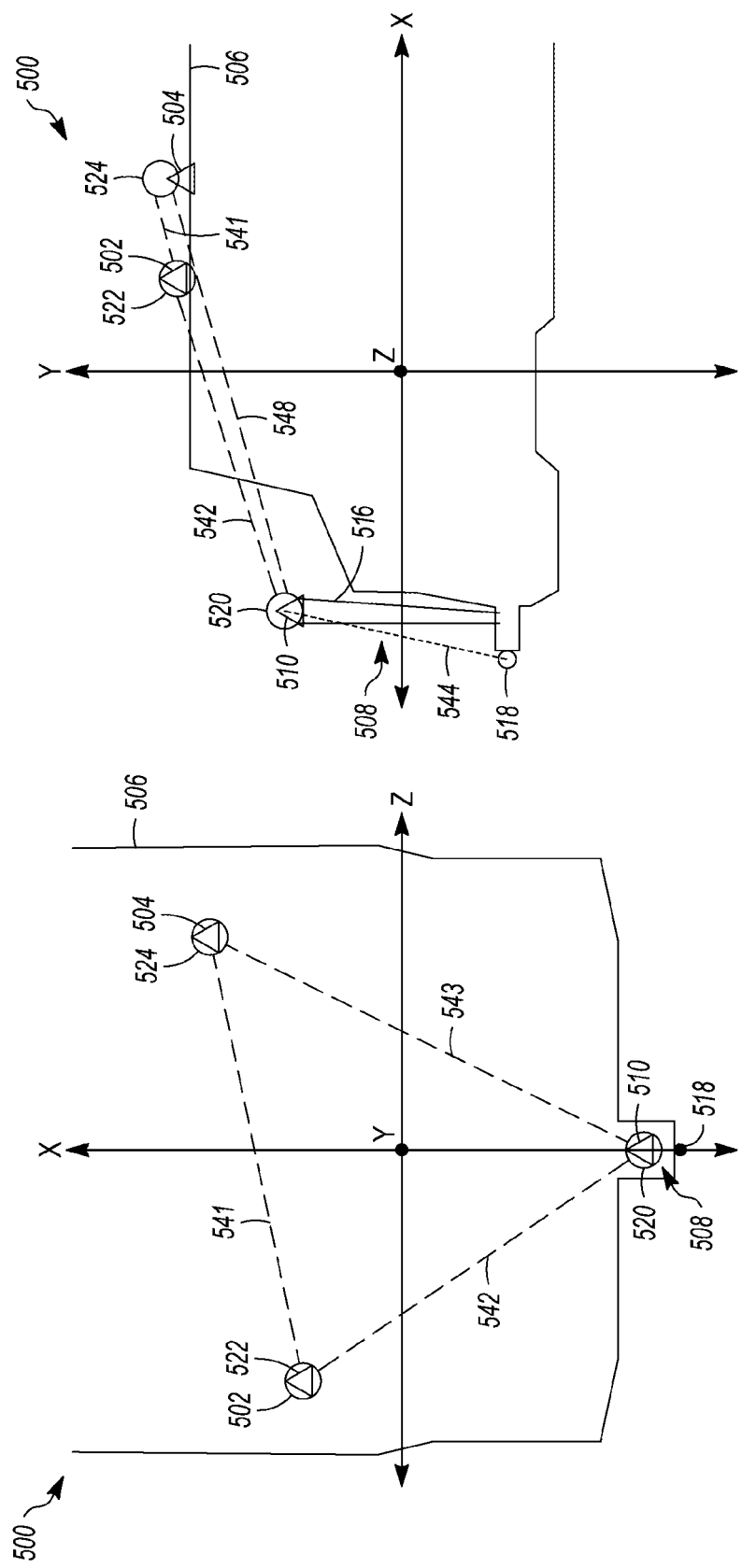
FIG. 5A is a top-down schematic view of a vehicle and illustrates where a device communication unit and two vehicle communication units may be positioned while acquiring location data in accordance with one embodiment.
FIG. 5B is a side schematic view of the vehicle and illustrates where the device communication unit and two vehicle communication units may be positioned while acquiring the location data in accordance with one embodiment.

FIGS. 5A and 5B illustrate different views of a vehicle 500 and a first communication unit 502 and a second communication unit 504 secured to a body 506 of the vehicle. For illustrative purposes, the vehicle is shown relative to mutually perpendicular X, Y, and Z axes. The first and second communication units may be onboard communication units that are capable of being used for other purposes. For example, a vehicle communication system of the vehicle may use the first and second communication units to communicate with a remote station, with another vehicle or vehicles of a vehicle system (e.g., command messages, reply messages, linking messages or the like), or with other vehicles that are move independently.

FIGS. 5A and 5B show a movable communication device 508 having a device communication unit 510. The movable communication device has a support structure 516 that elevates the device communication unit to a greater height so that, for example, the device communication unit may have an unobstructed path for receiving location data. Prior to acquiring the location data, the device communication unit is positioned relative to the vehicle or, more specifically, relative to a designated point 518 of the vehicle. The device communication unit is located at a device spatial location 520, the first communication unit is located at a first spatial location 522, and the second communication unit is located at a second spatial location 524.

Each of the communication units acquires location data (e.g., from one or more satellites) to determine the corresponding spatial location of the communication unit. The communication units may acquire the location data simultaneously or within seconds of each other. However, it is understood that the communication units may acquire the location data at separate times. Optionally, the communication units may acquire the location data multiple times within a designated time period (e.g., ten seconds, thirty seconds, one minute, or multiple minutes) and determine the spatial location (e.g., an average spatial location) of the corresponding unit using the location data from multiple acquisitions.

With the spatial locations of the different communication units known, a relative position of the device communication unit with respect to the first communication unit and with respect to the second communication unit may be acquired. For example, one or more embodiments may determine a first distance 541 between the first spatial location and the second spatial location, a second distance 542 between the device spatial location and the first spatial location, and a third distance 543 between the device spatial location and the second spatial location. A point-device separation distance 544 from the device communication unit to the designated point may be determined. For example, with dimensions of the movable communication device known, the point-device separation distance may be calculated when the movable communication device is positioned relative to the vehicle in a designated manner. For example, the movable communication device may be positioned such that an end of the support structure engages the vehicle (e.g., at the coupler) and such that the support structure extends parallel to the Z-axis. Accordingly, a relative position of the designated point with respect to the first communication unit and the second communication unit may then be determined.

Embodiments in which the device communication unit is vertically aligned with the designated point of the vehicle may reduce potential error in calculating the vehicle spatial location by reducing the number of calculations and potential measurement error.

Figure 6:
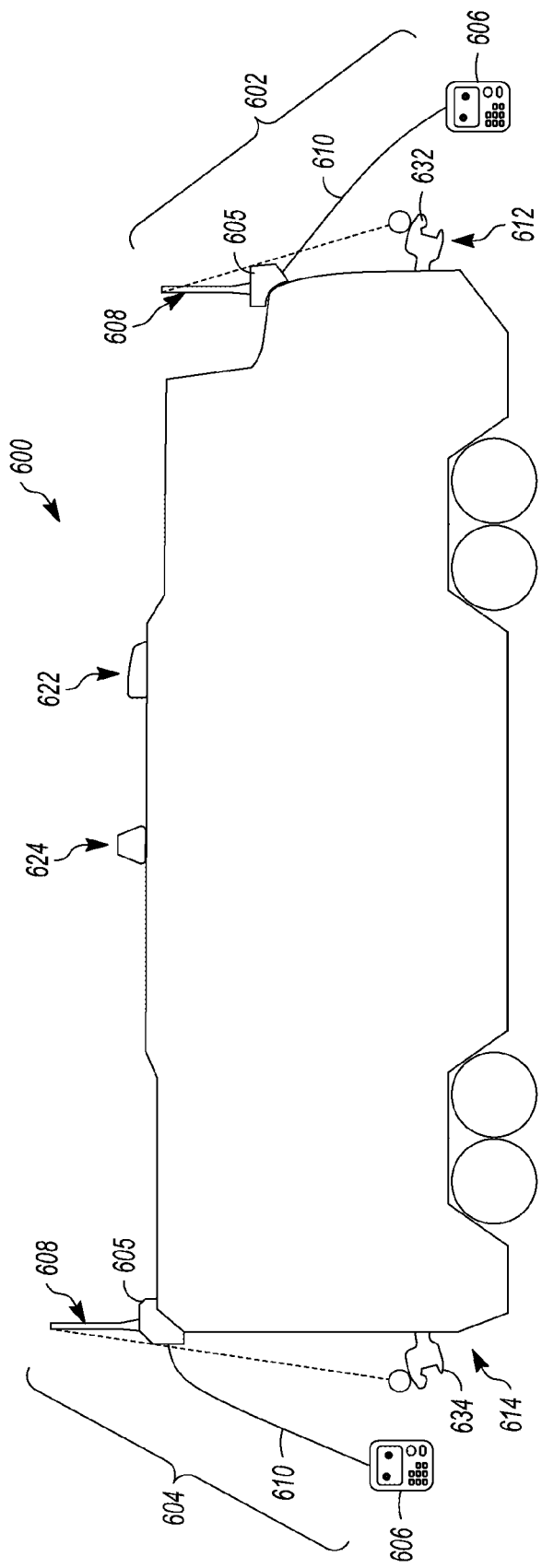
FIG. 6 is a side view of a vehicle showing two movable communication devices used to acquire location data at a front end and a back end of the vehicle in accordance with one embodiment.

FIG. 6 is a side view of a vehicle 600 showing two movable communication devices 602, 604 used to acquire location data at a front end 612 and a back end 614 of the vehicle, although other embodiments may acquire location data at different positions of the vehicle. The vehicle include a first communication unit 622 and a second communication unit 624. In the illustrated embodiment, each of the movable communication devices may include a device body 606, a communication unit 608 (e.g., antenna), a cable 610 interconnecting the device body and the communication unit, and a support structure 605.

The device communication units are positioned relative to the vehicle such that the spatial locations of the device communication units are positioned relative to designated points 632, 634. For example, the device communication units are positioned to align with a surface of the front end or a surface of the back end. In the illustrated embodiment, the support structure is a platform or frame that may be temporarily secured to the vehicle. In such embodiments, the support structure can may hold the communication unit in a fixed position relative to the vehicle. For example, the support structure may include at least one of a fastener (e.g., clasp, clamp, clip, screw, or the like) or a magnet that engages a surface of the vehicle. The fastener and/or magnet may be suitable for holding the support structure and the communication unit at a fixed position relative to the vehicle.

The device body may be similar to a portable communication device, such as a laptop computer, tablet computer, or smartphone. The device body is communicatively coupled to the device communication unit through the cable. Alternatively, the device body may communicate wirelessly with the device communication unit. As described herein, the device communication units and the vehicle communication units can obtain location data that is used to determine a spatial location of the corresponding communication unit. With the spatial locations known, a vehicle spatial location of designated points may be determined.

Figure 7A:
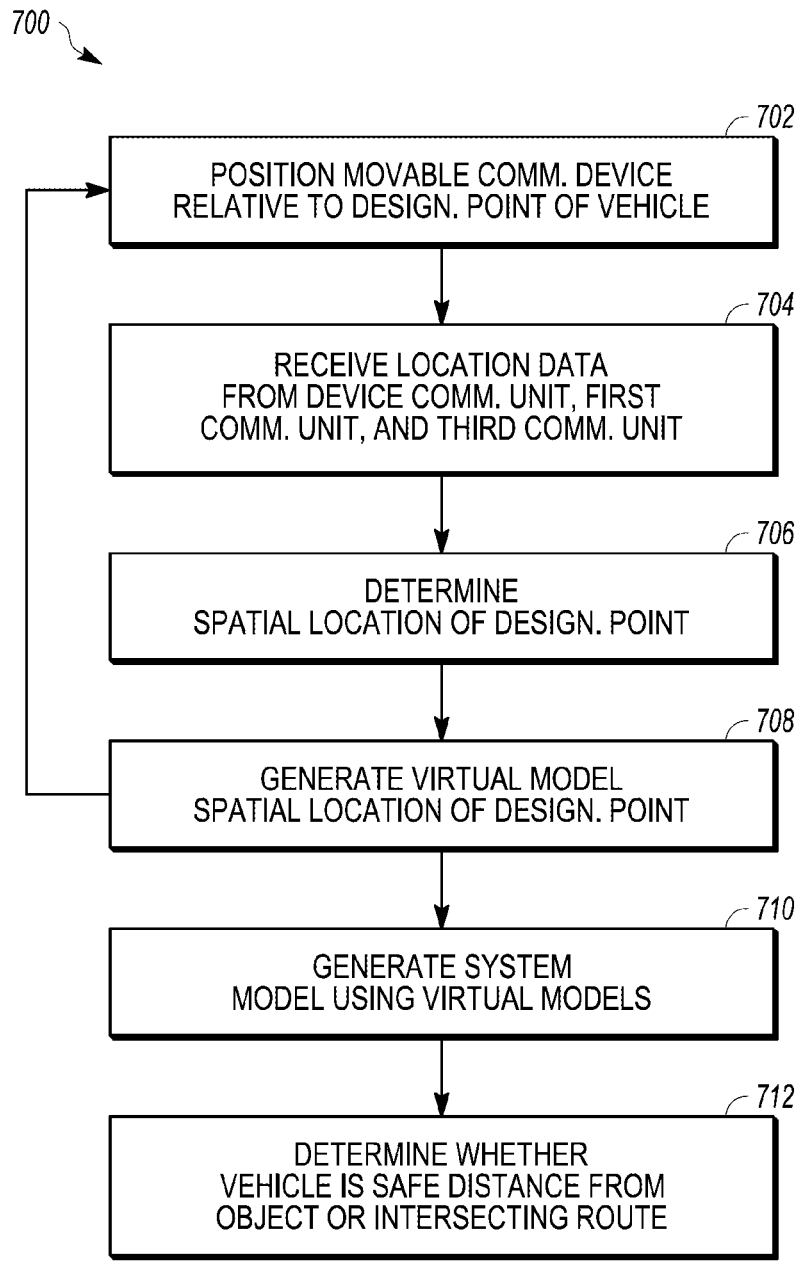
FIG. 7A is a flowchart illustrating a method in accordance with one embodiment.

FIG. 7A is a flowchart illustrating a method 700 in accordance with one embodiment. The method 700 may be carried out by a communication system, such as the communication system shown in FIG. 1, or by one or more sub-systems of the communication system. Depending upon the embodiment, each of the sub-systems may operate as a controlling or master entity and the other entities may operate as a slave entity. For example, the method may be carried out using a movable communication device, at least one vehicle, and a remote station. Optionally, the method may be initiated or led by the remote station with one or more movable communication devices and one or more vehicles being responsive to requests from the remote station. Alternatively, embodiments may be carried out by a movable communication device with one or more vehicles and, optionally, another movable communication device being responsive to requests from the movable communication device. Alternatively, embodiments may be carried out by a vehicle with one or more movable communication devices being responsive to requests from the vehicle.

At 702, a movable communication device is positioned relative to a vehicle. For example, the movable communication device may be positioned such that the device communication unit is adjacent to a designated point of the vehicle. Alternatively, the device communication unit may be positioned adjacent to a designated surface of the vehicle having, for example, a known relative location with respect to the designated point.

At 704, location data may be received at, for example, one or more processors of the communication system. The one or more processors may include at least one device processor of the movable communication device, at least one vehicle processor of the vehicle, or at least one remote or station processor of the remote station. In particular embodiments, a common entity receives the location data from each of the communication units. For example, the movable communication device can receive location data from the device communication unit and from the first and second communication units of the vehicle. Alternatively, the remote station can receive location data from the device communication unit and from the first and second communication units of the vehicle. In another embodiment, a vehicle communication system receives the location data from the device communication unit and from the first and second communication units.

At 706, the device spatial location of the device communication unit, the first spatial location of the first communication unit, and the second spatial location of the second communication unit may be determined. For example, each spatial location may include a longitude, latitude, and elevation that is calculated by the timing data received by multiple satellites. In some embodiments, the spatial location is determined by the communication unit or by the entity associated with the communication unit. For example, the at least one device processor of the movable communication device may determine the spatial location of the device communication unit, and the at least one vehicle processor of the vehicle communication system may determine the spatial locations of the first and second communication units. In other embodiments, the spatial location for a communication unit is determined by a common entity. For example, the remote station may receive the location data from the device communication unit and the first and second communication units and determine the device spatial location, the first spatial location, and the second spatial location, respectively.

A virtual model may be generated, at 708, using the spatial locations. A virtual model of the vehicle may be used by a positioning system. More specifically, the virtual model provides one or more points that are positioned relative to an estimated location of the vehicle. More specifically, the estimated location of the vehicle typically corresponds to the spatial location identified by the first communication unit, the second communication unit, or another communication unit that is capable of receiving location data (e.g., position and timing data or the like). With the spatial location of the in-use communication unit known within a useful time period (e.g., in real-time), the virtual model may identify the designated point of the vehicle.

For example, the virtual model may be based on the vehicle spatial location of the designated point of the vehicle. The vehicle spatial location is based on the device spatial location, the first spatial location, and the second spatial location. In particular embodiments, the vehicle spatial location is based on a first distance between the first spatial location and the second spatial location, a second distance between the device spatial location and the first spatial location, and a third distance between the device spatial location and the second spatial location.

Figure 7B:
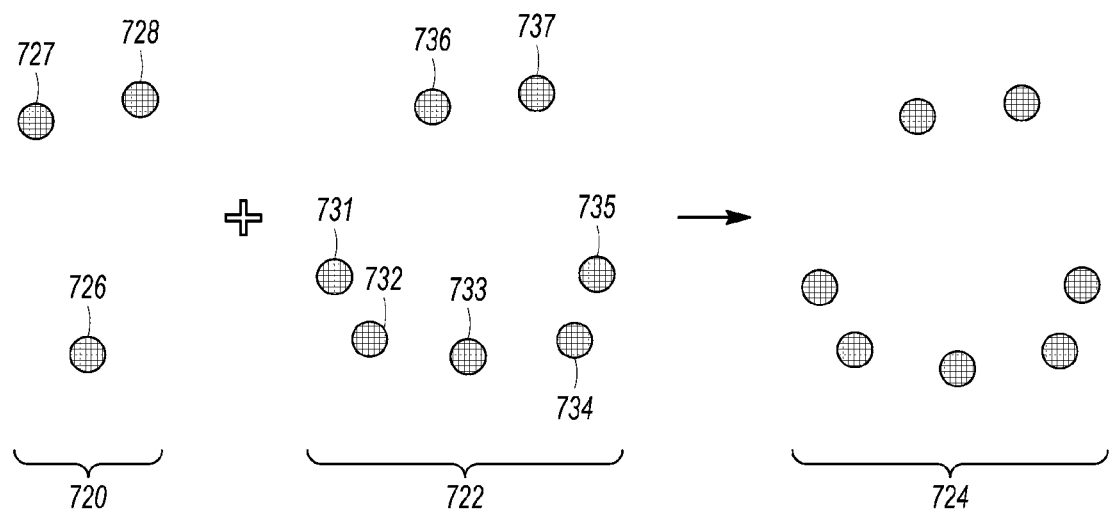
FIG. 7B illustrates how a virtual model of the vehicle may be generated using a local model, which was generated by one embodiment, and a geometric model.

In some embodiments, the virtual model is based on multiple models in which data from at least two models has been combined in some manner. FIG. 7B illustrates one such example. For example, a virtual model 724 may be based on a local model 720 and at least one geometric model 722 of the vehicle. The local model represents an outer boundary (e.g., exterior surface or exterior features) of the vehicle that is defined by at least one boundary point 726 determined by embodiments set forth herein. In some embodiments, the boundary point corresponds to the vehicle spatial location of the designated point. The local model may include at least one point for a vehicle communication unit. In FIG. 7B, the local model may include a point 727 and a point 728 that represent the first communication unit and the second communication unit of the vehicle.

Optionally, the local model and the geometric model may be registered with one another. A geometric model represents another model of the vehicle that at least represents a portion of the physical structure of the vehicle. The geometric model, however, may not generated using location data acquired by the movable communication device as described herein. Instead, the geometric model may be based on, for example, a manufacturer's specification or drawing or another modeling process (e.g., image analysis).

The geometric model may include at least one other boundary point. For example, the geometric model in FIG. 7B includes five boundary points 731, 732, 733, 734, and 735 located along a front end and two points 736 and 737 representing two vehicle communication units. To register the local model and the geometric model, at least two common or shared points of each of the models may be identified. Shared points reference the same landmark or feature of the vehicle. In the illustrated embodiment, the shared points include the points corresponding to the first and second communication units, which are the points 727, 736 for the first communication unit, the points 728, 737 for the second communication unit, and the points 726, 733 for the designated point of the vehicle. To register or combine the models, at least one the local model or the geometric model may be processed (compressed or stretched) so that the shared points coincide with one another. Because the local model is specific to the vehicle-of-interest and is based on actual data, the local model may be dominant when registering or otherwise combining the two models.

With the geometric model and the local model registered to form the virtual model, the virtual model may include the designated boundary point and the at least one other boundary point. In FIG. 7B, the virtual model has an equal number of points as the geometric model. However, one or more of the points in the virtual model has been shifted, with respect to another model, during the registering/combining process.

In other embodiments, a boundary point may have a known relative location with respect to the designated point. The local model may include multiple boundary points that extend laterally across an end of the vehicle. For example, the boundary points may extend across a forward or rearward surface of a bumper. At least one of the boundary points corresponds to the vehicle spatial location. Other boundary points may have a known position with respect to the vehicle spatial location. For example, if the designated point may be located at a center of the front end, the other boundary points, which were not determined using the device communication unit, may be distributed on either side of the designated point. As such, the boundary shown in the virtual model may define a boundary or exterior surface of the vehicle using a limited set of points. In this manner, a model of the vehicle may be used that does not require excessive computational resources.

In other embodiments, the local model is at most two points, such as the designated point and a point representing one of the vehicle communication units. In such embodiments, the designated point is positioned relative to the estimated location of the vehicle communication unit and may be tracked to ensure the vehicle does not collide with other vehicles. Yet in other embodiments, the local model is at most three points, such as the designated point and two points representing two vehicle communication units.

Returning to FIG. 7A, optionally, the method may return to re-position, at 702, the movable communication device relative to a designed point of another vehicle and the method may be carried out again one or more times.

After generating multiple virtual models the virtual models may be used to generate, at reference number 710, a system model for a vehicle system having multiple vehicles. At least two of the vehicles of the vehicle system may have virtual models, as described herein. The system model may be generated by combining, in some manner, the virtual model of a first vehicle with the virtual model of a second vehicle and so forth.

At reference number 712, the virtual model may be used by a positioning system to determine, a position of the vehicle. The positioning system may be a conventional and/or well-known radionavigation system (e.g., a GNSS or a RNSS) or a proprietary navigation system. In some embodiments, the position of the vehicle may not be represented by a single point. Instead, a vehicle position may be determined by two or three points. For example, the vehicle position may be determined by a point representing a front end, a point representing a vehicle communication unit (e.g., GPS receiver), and a point representing a back end. In other embodiments, the vehicle position is represented by only a single point, such as the front end or the back end of the vehicle. In either example, embodiments may monitor a position of the vehicle so that the vehicle remains a safe distance from an object or intersecting route.

Figure 8:
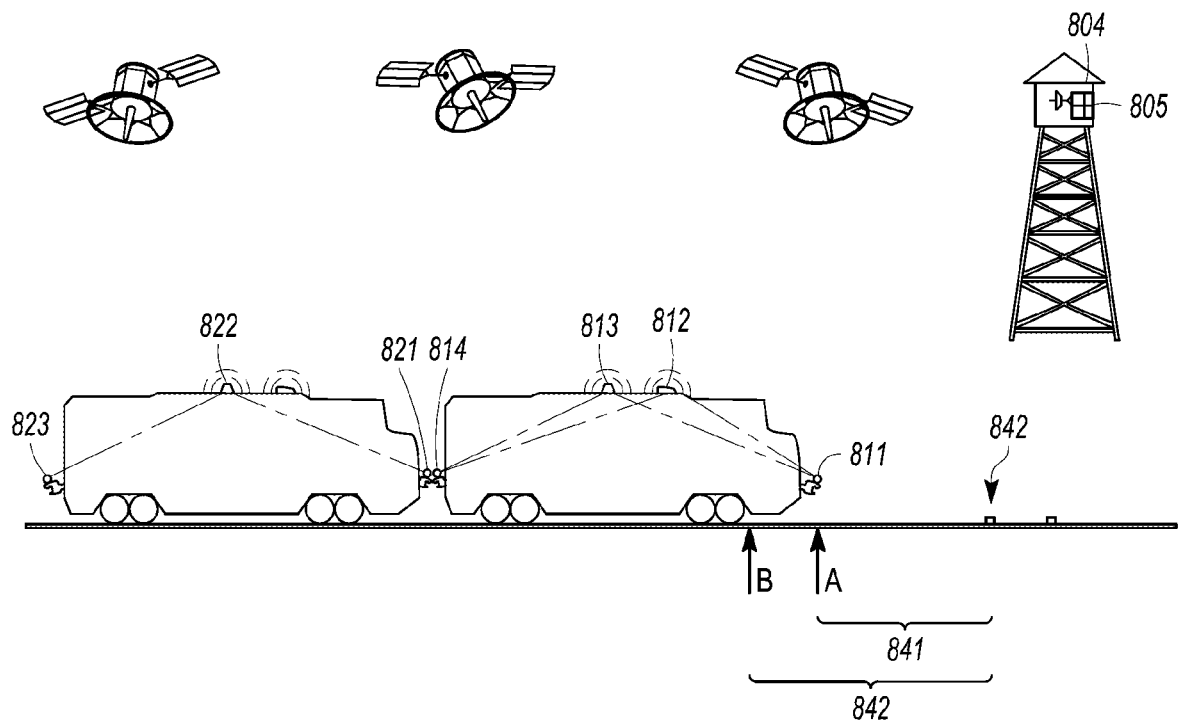
FIG. 8 illustrates an environment, in accordance with one embodiment, in which a positioning system locates vehicles using virtual models of the vehicles.

FIG. 8 illustrates one environment in which a vehicle system 800 has a first (or leading) vehicle 801 and a second (or trailing) vehicle 802 that are mechanically coupled to one another. Throughout operation of the vehicle system, a remote facility 804 having a positioning system 805 may track a position of one or both vehicles and/or track a position of the vehicle system. To this end, the positioning system may use virtual models having one or more boundary points. In the illustrated embodiment, the virtual models include three or four boundary points. In FIG. 8, the first vehicle may include four boundary points 811, 812, 813, 814 and the second vehicle may include three boundary points 821, 822, 823. Each of these boundary points may be tracked or only one or more boundary points may be tracked.

In one or more embodiments, the virtual models described herein enable more accurate estimations of a position of a vehicle. As such, the positioning system may permit the vehicle system to reach closer to an object or intersection. For example, embodiments may permit stopping the boundary point 811 at location A instead of location B. A gap 841 between location A and an intersection or object 842 may be shorter than a gap 843 between location B and the intersection or object.

Figure 9A:
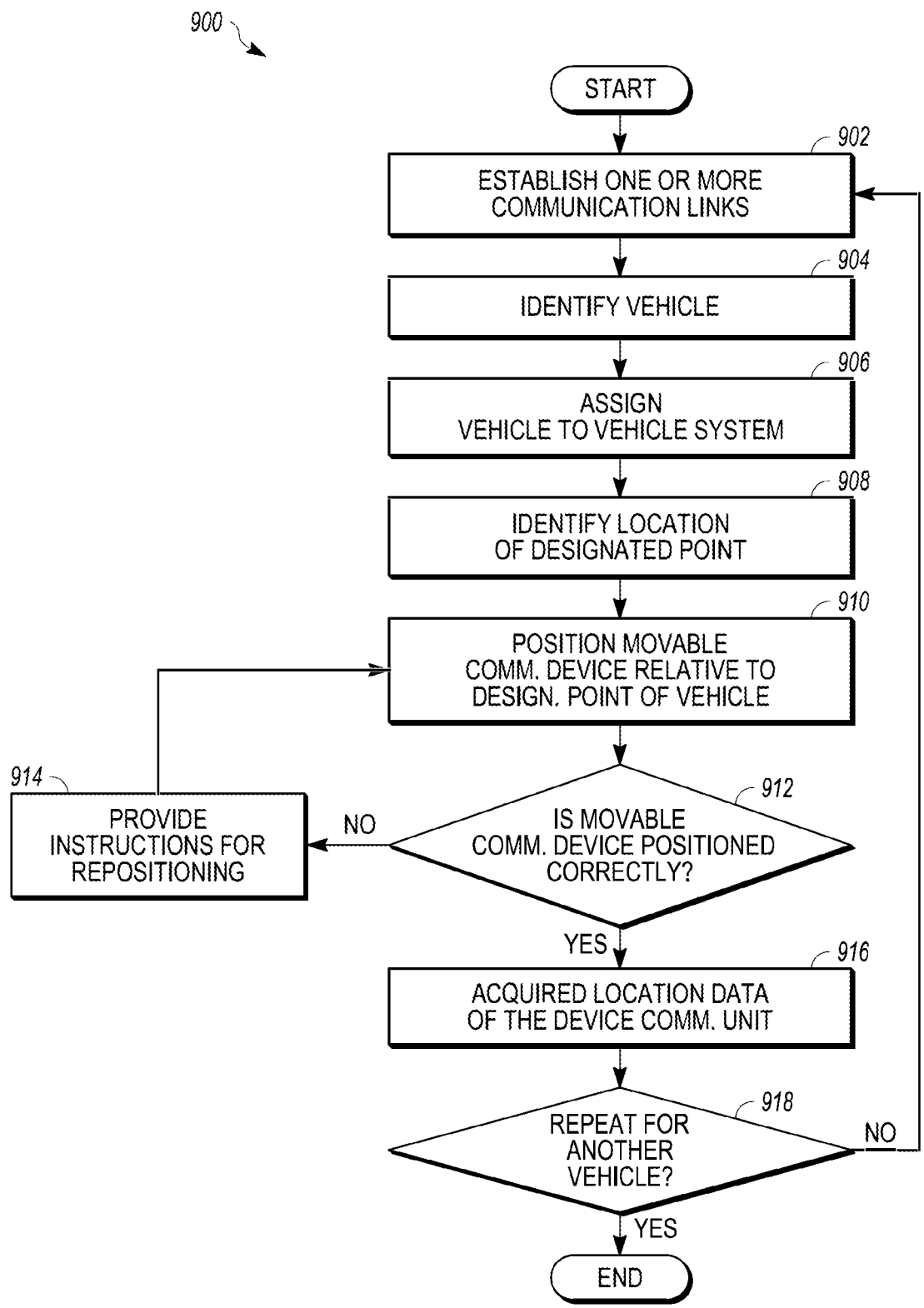
FIG. 9A is a flowchart illustrating a method of using a movable communication device to acquire location data in accordance with one embodiment.
Figure 9B:
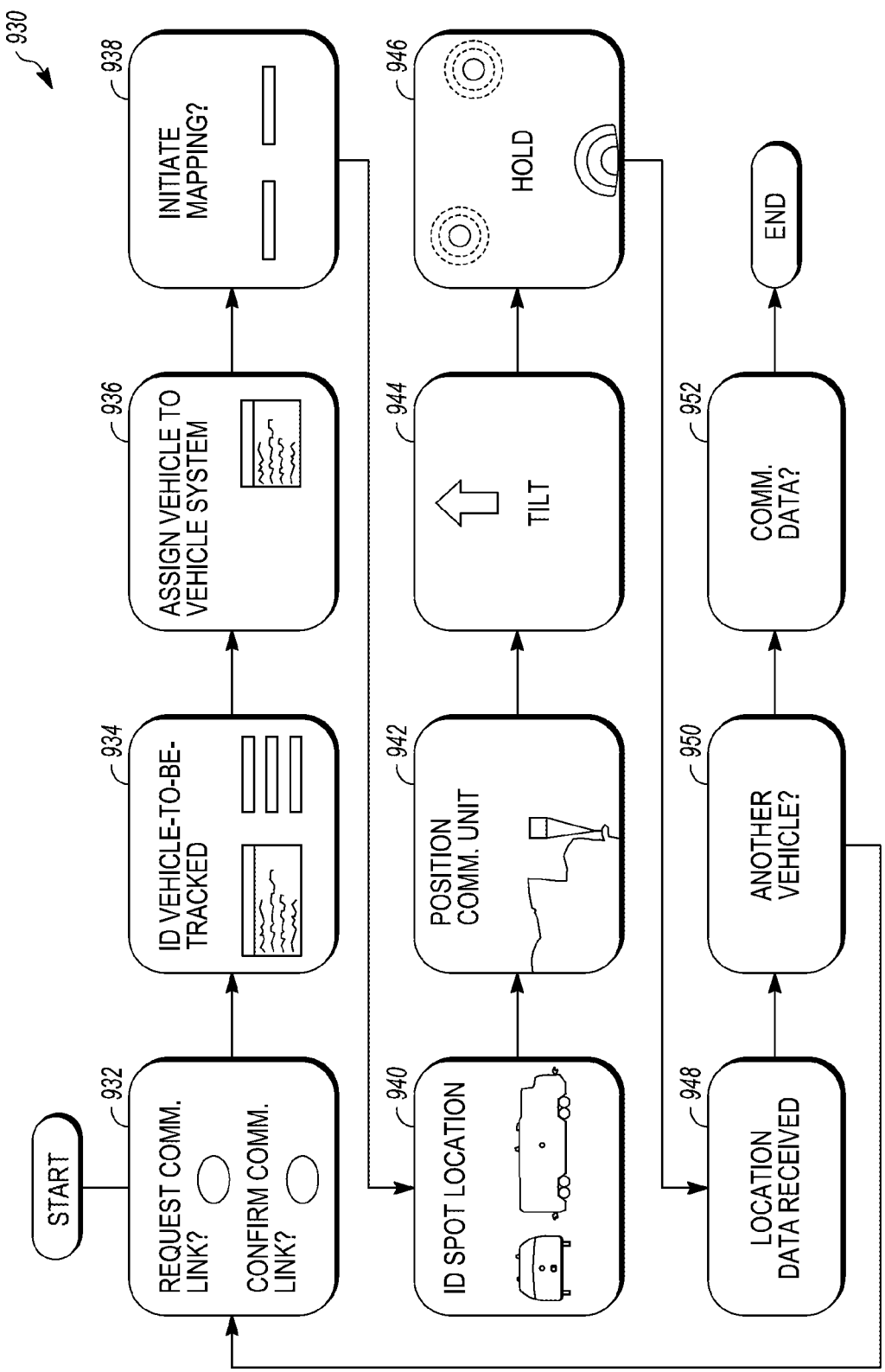
FIG. 9B illustrates a workflow of screen displays that may be presented to a user of the movable communication device.

FIG. 9A is a flowchart illustrating a method 900 in accordance with one embodiment and is described with reference to FIG. 9B, which shows a workflow 930 of screen displays that may be presented to a user of one or more embodiments. Although the following will describe the method in which only the display of the movable communication device presents the screen displays, it should be understood that other embodiments may utilize a display in a vehicle or a display at a remote station to present one or more of the screen displays to a user.

To acquire location data for generating a virtual model of a vehicle, it may be necessary to establish, at step 902, a communication link between the movable communication device, the vehicle, and/or the remote station. The user interface of the movable communication device may display a screen prompt step 932 asking if the user would like to at least one of request a communication link, thereby communicating a linking message to another system, or assent to a communication link with another system, thereby communicating a confirmation message. In some embodiments, the requesting and/or confirm may occur automatically. For example, if the user has initiated a local application on the movable communication device, it may be assumed that the user would like to establish a communication link. Optionally, the screen prompt may present options for potential communication links. For example, the screen prompt may show a number of vehicles that may be communicated with or show that the remote station may be available.

Optionally, at step 904, the vehicle-of-interest may be identified and, at step 906, the vehicle-of-interest may be assigned to a vehicle system. The vehicle-of-interest is the vehicle that the user desires to acquire location data for generating a virtual model. The identification and assignation operations may occur at a later time or the user may request the operations. For example, a screen prompt step 934 may be presented to a user and request identifying information from the user. Individual queries requesting information may be presented to the user. For example, the screen prompt step 934 may request a vehicle identification number, a type of vehicle, or other identifying features of the vehicle. Similarly, a screen prompt step 936 may be present to the user and request identifying information of the vehicle system. Such identifying information may include a destination of the vehicle system, number of vehicles, track line, and the like.

With the vehicle identified and the vehicle system assigned, the location data acquired by the movable communication device may be communicated to other systems with the identifying information.

The screen prompt step 938 may request the user to confirm that the user would like to initiate acquiring location data or otherwise mapping designated points of the vehicle relative to the communication units. At step 908, the designated point of the vehicle may be identified. Vehicles may have more than one potential designated point and/or the user may choose to identify only one designated point when multiple designated points are available. Depending upon the circumstances, it may be easier to acquire one designated point over another. As such, a screen prompt step 940 may be presented to the user and request that the user identify the designated point or points that will be located. For example, one or more images of the type of vehicle may be presented to the user. Optionally, the images may include highlighted points or areas indicating potential designated points. User inputs may identify the designated point or points.

At step 910, the device communication unit is positioned relative to the vehicle. In particular embodiments, a screen prompt step 942 may instruct the user to position the communication unit in a designated manner. For example, depending upon the support structure available, the screen prompt step 942 may instruct the user how to hold the communication unit.

At step 912, the method may query whether the communication unit is positioned correctly and, if not, provide instructions, at step 914, for repositioning the communication unit. For some embodiments, such as those having the communication unit integrated with the device body, a screen prompt step 944 may instruct the user to re-orient the communication unit, such as by shifting, tilting, or rotating. When the communication unit has the correct position, a screen prompt step 946 may instruct the user to hold the communication unit in a stationary manner until the location data is acquired.

At step 916, the method may confirm that the location data has been received. For example, a screen prompt step 948 may notify the user that the location data has been received. At step 918, the method may query whether the method should be repeated for another designated point on the same vehicle or another vehicle, as illustrated by a screen prompt step 950. If so, the method may be repeated.

Upon mapping the number of desired designated points, in some embodiments, a screen prompt step 952 may query whether the location data should be communicated to another system, such as the remote station.

In one or more embodiments, a system is provided that may include a movable communication device including a device communication unit. The device communication unit may be positioned relative to the vehicle. The system may include a controller with one or more processors that can receive location data from the device communication unit and from at least a first communication unit and a second communication unit that are positioned relative to the vehicle. The location data may include a device spatial location of the device communication unit, a first spatial location of the first communication unit, and a second spatial location of the second communication unit. The processors may determine a vehicle spatial location of a designated point of the vehicle based on a first distance between the first spatial location and the second spatial location, a second distance between the device spatial location and the first spatial location, and a third distance between the device spatial location and the second spatial location. The processors may generate a virtual model of the vehicle based on the vehicle spatial location of the designated point. The virtual model, when used by a positioning system to locate the vehicle, indicates the vehicle spatial location relative to an estimated location of the vehicle.

In one or more aspects, the processors may generate a local model that represents an outer boundary of the vehicle. The local model may include, for example, a designated boundary point based on the vehicle spatial location of the designated point. The processors, when generating the virtual model, may register the local model and a geometric model of the vehicle to one another. The geometric model may include, for example, at least one other boundary point representing at least one other point along the outer boundary of the vehicle. The virtual model may include the designated boundary point and the at least one other boundary point.

Optionally, the outer boundary may represent at least one of a front surface of the vehicle, a rear surface of the vehicle, or a side surface of the vehicle that extends between the front and rear surfaces.

In one or more aspects, the virtual model may include a designated boundary point that is based on the vehicle spatial location of the designated point and represents a forward end or a rearward end of the vehicle. The processors may determine whether the vehicle is a safe distance from an object or intersecting route using the designated boundary point.

In one or more aspects, the movable communication device may include at least one device processor of the one or more processors. The system may comprise a remote station that may include at least one station processor of the one or more processors. Optionally, the at least one device processor of the movable communication device may communicate at least one of the virtual model, the geometric model, the geometric model and the virtual model, as registered together, the device spatial location, the first spatial location, the second spatial location, or the vehicle spatial location.

In one or more aspects, the vehicle is a first vehicle, the location data is first location data, the device spatial location is a first device spatial location, the vehicle spatial location is a first vehicle spatial location, and the virtual model is a first virtual model. The processors, after the device communication unit is moved from the first vehicle and positioned relative to a second designated point of a second vehicle, may receive second location data from the device communication unit and from at least a third communication unit and a fourth communication unit that are positioned relative to the second vehicle. The second location data may include a second device spatial location of the device communication unit, a third spatial location of the third communication unit, and a fourth spatial location of the fourth communication unit. The one or more processors may determine a second vehicle spatial location of the second designated point based on a fourth distance between the third spatial location and the fourth spatial location, a fifth distance between the second vehicle spatial location and the third spatial location, and a sixth distance between the second vehicle spatial location and the fourth spatial location. The one or more processors may generate a second virtual model of the second vehicle based on the second vehicle spatial location of the second designated point. The second virtual model, when used by the positioning system to locate the second vehicle, can indicate the second vehicle spatial location relative to an estimated location of the vehicle.

Optionally, the one or more processors may generate a system model of a vehicle system having the first and second vehicles using the first virtual model and the second virtual model. In one or more aspects, the one or more processors may receive user inputs from an input device and, responsive to receiving the user inputs, at least one of assign the vehicle to a vehicle system or fleet having plural vehicles or assign a vehicle type to the vehicle. In one or more aspects, the movable communication device can include a user interface that can receive a user input. The user interface may communicate a request for the location data from the device communication unit in response to receiving the user input.

In one or more aspects, the movable communication device may communicate a message to a local control unit of the vehicle. The message can request the location data from the first and second communication units. In one or more aspects, the movable communication device can include a user interface that may receive a user input. The user interface, responsive to receiving the user input, may assign the designated point to a structural feature of the vehicle or identify a relative position of the movable communication device when the movable communication device is positioned relative to the vehicle. In one or more aspects, the movable communication device can include a sensor assembly for determining at least one of an altitude of the movable communication device or a position of the movable communication device relative to the vehicle. The processors may receive position data from the sensor assembly and notify an operator of the movable communication device that the movable communication device is correctly positioned relative to the vehicle.

In one or more embodiments, a movable communication device is provided that may include a device communication unit that may acquire location data and a user interface that may receive user inputs and, responsive to receiving the user inputs, communicate control signals. The movable communication device may include processors that may receive the control signals from the user interface. Responsive to receiving the control signals, the processors may request and receive the location data from the device communication unit. The processors may communicate a device message to at least one of a remote station or the vehicle. The device message may include at least one of the location data or a request for location data from the vehicle. The processors may receive a vehicle message from the vehicle. The vehicle message may include the location data of the vehicle from a first communication unit and a second communication unit of the vehicle.

In one or more aspects, the processors of the movable communication device, prior to requesting the location data from the device communication unit, may confirm that the movable communication device has a designated position relative to the designated point. In one or more aspects, the one or more processors, responsive to user inputs, may assign the vehicle to a vehicle system or fleet having plural vehicles. In one or more aspects, the movable communication device can include a fastener for securing the movable communication device to the vehicle at a fixed position.

In one or more embodiments, a method is provided that may include positioning a movable communication device relative to a designated point of the vehicle. The movable communication device may include a device communication unit. The method may include receiving location data from the device communication unit and from at least a first communication unit and a second communication unit that are positioned relative to the vehicle. The location data may include a device spatial location of the device communication unit, a first spatial location of the first communication unit, and a second spatial location of the second communication unit. The method may include determining a vehicle spatial location of a designated point of the vehicle based on a first distance between the first spatial location and the second spatial location, a second distance between the device spatial location and the first spatial location, and a third distance between the device spatial location and the second spatial location. The method may include generating a virtual model of the vehicle based on the vehicle spatial location of the designated point. The virtual model, when used by a positioning system to locate the vehicle, indicates the vehicle spatial location relative to an estimated location of the vehicle.

In one or more aspects, the method may include generating a local model that represents an outer boundary of the vehicle. The local model can include a designated boundary point based on the vehicle spatial location of the designated point. The method may include generating the virtual model, registering the local model and a geometric model of the vehicle to one another. The geometric model can include at least one other boundary point representing at least one other point along the outer boundary of the vehicle. The virtual model may include the designated boundary point and the at least one other boundary point. In one or more aspects, the outer boundary represents at least one of a front surface of the vehicle, a rear surface of the vehicle, or a side surface of the vehicle that extends between the front and rear surfaces. In one or more aspects, the movable communication device may inform the virtual model. The device spatial location, the first spatial location, the second spatial location, or the vehicle spatial location.

In one or more aspects, the vehicle is a first vehicle, the location data is first location data, the device spatial location is a first device spatial location, the vehicle spatial location is a first vehicle spatial location, and the virtual model is a first virtual model. The method can include positioning the movable communication device relative to a second designated point of a second vehicle. The method can include receiving second location data from the device communication unit and from at least a third communication unit and a fourth communication unit that are positioned relative to the second vehicle. The second location data can include a second device spatial location of the device communication unit, a third spatial location of the third communication unit, and a fourth spatial location of the fourth communication unit. The method can include determining a second vehicle spatial location of the second designated point on the vehicle based on the second device spatial location of the device communication unit. The method can include generating a second virtual model of the second vehicle based on a fourth distance between the third spatial location and the fourth spatial location, a fifth distance between the second vehicle spatial location and the third spatial location, and a sixth distance between the second vehicle spatial location and the fourth spatial location.

In one or more aspects, the method can include receiving user inputs from an input device and, responsive to receiving the user inputs, at least one of assigning the vehicle to a vehicle system or fleet having plural vehicles or assigning a vehicle type to the vehicle. Optionally, the method may include generating a system model of a vehicle system having the first and second vehicles using the first virtual model and the second virtual model. Optionally, the method may include receiving, at a user interface of the movable communication device, a user input, and transmitting a request, from the device communication unit, for the location data in response to receiving the user input. In one or more aspects, the method can include transmitting, from the device communication unit, a message to a local control unit of the vehicle, wherein the message requests the location data from the first and second communication units. In one or more aspects, the movable communication device can include a user interface that may receive a user input, the method can include, responsive to receiving the user input, at least one of assigning the designated point to a structural feature of the vehicle or identifying a relative position of the movable communication device when the movable communication device is positioned relative to the vehicle.

The description is illustrative and not restrictive. For example, the embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
 a movable communication device including a device communication unit, the device communication unit configured to be positioned relative to a vehicle;
 a controller having one or more processors configured to:
 receive location data from the device communication unit and from at least a first communication unit and a second communication unit that are positioned relative to the vehicle, the location data including a device spatial location of the device communication unit, a first spatial location of the first communication unit, and a second spatial location of the second communication unit;
 determine a vehicle spatial location of a designated point of the vehicle based on a first distance between the first spatial location and the second spatial location, a second distance between the device spatial location and the first spatial location, and a third distance between the device spatial location and the second spatial location; and
 generate a virtual model of the vehicle based on the vehicle spatial location of the designated point, the virtual model, when used by a positioning system to locate the vehicle, indicating the vehicle spatial location relative to an estimated location of the vehicle.

2. The system of claim 1, wherein the one or more processors are further configured to generate a local model that represents an outer boundary of the vehicle, the local model including a designated boundary point based on the vehicle spatial location of the designated point, wherein the one or more processors are further configured to, when generating the virtual model, register the local model and a geometric model of the vehicle to one another, the geometric model including at least one other boundary point representing at least one other point along the outer boundary of the vehicle, the virtual model including the designated boundary point and the at least one other boundary point.

3. The system of claim 1, wherein the virtual model includes a designated boundary point that is based on the vehicle spatial location of the designated point and represents a forward end or a rearward end of the vehicle, wherein the one or more processors are further configured to determine whether the vehicle is a designated distance from an object or intersecting route using the designated boundary point.

4. The system of claim 1, wherein the movable communication device includes at least one device processor of the one or more processors and the system further comprises a remote station that includes at least one station processor of the one or more processors, wherein:
the at least one device processor of the movable communication device is configured to communicate at least one of the virtual model, a geometric model, both the geometric model and the virtual model registered together, the device spatial location, the first spatial location, the second spatial location, or the vehicle spatial location.

5. The system of claim 1, wherein the vehicle is a first vehicle, the location data is first location data, the device spatial location is a first device spatial location, the vehicle spatial location is a first vehicle spatial location, and the virtual model is a first virtual model, the one or more processors are further configured to, after the device communication unit is moved from the first vehicle and positioned relative to a second designated point of a second vehicle:
receive second location data from the device communication unit and from at least a third communication unit and a fourth communication unit that are positioned relative to the second vehicle, the second location data including a second device spatial location of the device communication unit, a third spatial location of the third communication unit, and a fourth spatial location of the fourth communication unit;
determine a second vehicle spatial location of the second designated point based on a fourth distance between the third spatial location and the fourth spatial location, a fifth distance between the second vehicle spatial location and the third spatial location, and a sixth distance between the second vehicle spatial location and the fourth spatial location; and
generate a second virtual model of the second vehicle based on the second vehicle spatial location of the second designated point, wherein the second virtual model, when used by the positioning system to locate the second vehicle, indicates the second vehicle spatial location relative to an estimated location of the second vehicle.

6. The system of claim 1, wherein the one or more processors are further configured to receive user inputs from an input device and, responsive to receiving the user inputs, at least one of assign the vehicle to a vehicle system or fleet having plural vehicles or assign a vehicle type to the vehicle.

7. The system of claim 1, wherein the movable communication device includes a user interface configured to receive a user input, the user interface being configured to communicate a request for the location data from the device communication unit in response to receiving the user input.

8. The system of claim 1, wherein the movable communication device is configured to communicate a message to a local control unit of the vehicle, the message requesting the location data from the first and second communication units.

9. The system of claim 1, wherein the movable communication device includes a user interface that is configured to receive a user input, the user interface, responsive to receiving the user input, being configured to:
assign the designated point to a structural feature of the vehicle; or
identify a relative position of the movable communication device when the movable communication device is positioned relative to the vehicle.

10. The system of claim 1, wherein the movable communication device includes a sensor assembly for determining at least one of an attitude of the movable communication device or a position of the movable communication device relative to the vehicle, the one or more processors being further configured to receive position data from the sensor assembly and notify an operator of the movable communication device that the movable communication device is correctly positioned relative to the vehicle.

11. A movable communication device:
a device communication unit configured to acquire location data;
a user interface configured to receive user inputs and, responsive to receiving the user inputs, communicate control signals;
one or more processors configured to receive the control signals from the user interface, wherein, responsive to receiving the control signals, the one or more processors are configured to request and receive the location data from the device communication unit, the one or more processors further configured to at least one of:
communicate a device message to at least one of a remote station or a vehicle, the device message including at least one of the location data or a request for location data from the vehicle; or
receive a vehicle message from the vehicle, the vehicle message including the location data of the vehicle from a first communication unit and a second communication unit of the vehicle.

12. The movable communication device of claim 11, wherein the one or more processors are further configured to, prior to requesting the location data from the device communication unit, confirm that the movable communication device has a designated position relative to a designated point.

13. The movable communication device of claim 11, wherein the one or more processors are further configured to, responsive to the user inputs, assign the vehicle to a vehicle system or fleet having plural vehicles.

14. The movable communication device of claim 11, wherein the movable communication device includes a fastener for securing the movable communication device to the vehicle at a fixed position.

15. A method comprising:
positioning a movable communication device relative to a designated point of a vehicle, the movable communication device including a device communication unit;
receiving location data from the device communication unit and from at least a first communication unit and a second communication unit that are positioned relative to the vehicle, the location data including a device spatial location of the device communication unit, a first spatial location of the first communication unit, and a second spatial location of the second communication unit;
determining a vehicle spatial location of the designated point of the vehicle based on a first distance between the first spatial location and the second spatial location, a second distance between the device spatial location and the first spatial location, and a third distance between the device spatial location and the second spatial location; and generating a virtual model of the vehicle based on the vehicle spatial location of the designated point, the virtual model, when used by a positioning system to locate the vehicle, indicating the vehicle spatial location relative to an estimated location of the vehicle.

16. The method of claim 15, wherein the method further comprises generating a local model that represents an outer boundary of the vehicle, the local model including a designated boundary point based on the vehicle spatial location of the designated point, wherein the method further comprises, for generating the virtual model, registering the local model and a geometric model of the vehicle to one another, the geometric model including at least one other boundary point representing at least one other point along the outer boundary of the vehicle, the virtual model including the designated boundary point and the at least one other boundary point, wherein the outer boundary represents at least one of a front surface of the vehicle, a rear surface of the vehicle, or a side surface of the vehicle that extends between the front and rear surfaces.

17. The method of claim 15, wherein the movable communication device is configured to communicate at least one of the virtual model, the device spatial location, the first spatial location, the second spatial location, or the vehicle spatial location.

18. The method of claim 15, wherein the vehicle is a first vehicle, the location data is first location data, the device spatial location is a first device spatial location, the vehicle spatial location is a first vehicle spatial location, and the virtual model is a first virtual model, the method further comprising:

positioning the movable communication device relative to a second designated point of a second vehicle;

receiving second location data from the device communication unit and from at least a third communication unit and a fourth communication unit that are positioned relative to the second vehicle, the second location data including a second device spatial location of the device communication unit, a third spatial location of the third communication unit, and a fourth spatial location of the fourth communication unit;

determining a second vehicle spatial location of the second designated point on the second vehicle based on the second device spatial location of the device communication unit; and generating a second virtual model of the second vehicle based on a fourth distance between the third spatial location and the fourth spatial location, a fifth distance between the second vehicle spatial location and the third spatial location, and a sixth distance between the second vehicle spatial location and the fourth spatial location.

19. The method of claim 18, wherein the method includes receiving user inputs from an input device and, responsive to receiving the user inputs, at least one of assigning the first vehicle or the second vehicle to a vehicle system or fleet having plural vehicles or assigning a vehicle type to the first vehicle or the second vehicle, wherein the method further comprises generating a system model of a vehicle system having the first and second vehicles using the first virtual model and the second virtual model.

20. The method of claim 15, further comprising:

receiving a user input at a user interface of the movable communication device; and transmitting a request, from the device communication unit, for the location data in response to receiving the user input.

* * * * *